United States Patent [19]

Rasmussen et al.

[11] 3,887,713

[45] June 3, 1975

[54] METHOD FOR PRODUCING FLEXIBLE CASINGS AND THE CASINGS OBTAINED THEREFROM

[75] Inventors: Jerome Jordan Michael Rasmussen, South Stickney Township; David Voo, Park Forest, both of Ill.

[73] Assignee: Union Carbide Corporation, New York, N.Y.

[22] Filed: Aug. 19, 1971

[21] Appl. No.: 173,250

Related U.S. Application Data

[63] Continuation of Ser. Nos. 789,350, Jan. 6, 1969, abandoned, and Ser. No. 839,651, July 7, 1969, abandoned.

[52] U.S. Cl. ............... 426/135; 106/168; 117/145; 264/129
[51] Int. Cl. ............................................ A22c 13/00
[58] Field of Search ...... 99/174, 175, 176; 106/166, 106/168; 264/129; 117/145; 426/135

[56] References Cited
UNITED STATES PATENTS

| | | | |
|---|---|---|---|
| 1,568,734 | 1/1926 | Hellerman | 99/175 |
| 2,866,710 | 12/1958 | Dowd | 99/176 |
| 2,961,323 | 11/1960 | Underwood | 99/176 |
| 2,982,660 | 5/1961 | Brissey | 99/176 X |
| 3,158,488 | 11/1964 | Firth | 99/176 X |
| 3,266,911 | 8/1966 | Clement | 99/176 |
| 3,431,127 | 3/1969 | Baetzel | 99/176 X |
| 3,607,328 | 9/1971 | Rose | 106/166 X |
| 3,674,523 | 7/1972 | Rose | 99/176 X |

*Primary Examiner*—Robert Halper
*Attorney, Agent, or Firm*—F. Schoenberg

[57] ABSTRACT

Improved flexibility and pliancy and the ability to be readily opened and shirred are characteristics and properties imparted to regenerated cellulosic casings containing a moisture-proof-gas barrier coating by incorporating a softening and anti-block additive in the viscose solution before the viscose solution is extruded into tubular form and further processed.

17 Claims, No Drawings

METHOD FOR PRODUCING FLEXIBLE CASINGS AND THE CASINGS OBTAINED THEREFROM

This application is a continuation-in-part of copending application Ser. No. 789,350 now abandoned filed Jan. 6, 1969 and copending application Ser. No. 839,651 now abandoned filed July 7, 1969.

This invention relates to a method for producing flexible casings obtained from regenerated cellulose and which have a moistureproof-gas barrier coating applied thereto.

The casings to which this invention relates can be employed for packaging and/or processing fresh food products such as shrimp, hams, turkeys and the like; fluid petroleum products such as oils, greases, lubricants and the like; and processed foods such as sausages, salamis, bolognas, liver sausages, cheese products, egg products, spiced hams and the like. When employed in the packaging and processing of processed foods, for example, these casings are generally manufactured in flat widths of from about 1 to 8 inches and can range in length from about 1 foot to 150 feet and longer.

Different types of regenerated cellulosic casings are produced to exhibit different characteristics for the types of end uses contemplated. For example, regenerated cellulosic casings are produced so that they will exhibit a tendency to adhere to a food item processed therein such as is disclosed and described in U.S. Pat. No. 3,378,379 to Shiner et al; or so that they will exhibit a tendency to be readily stripped and removed from a food item processed therein such as is disclosed and described in U.S. Pat. No. 3,307,956 to Chiu et al; or to impart to them low moisture vapor transmission and low gas transmission rates such as coating their surfaces with a film such as a vinylidine chloride copolymer resin such as is disclosed and described in U.S. Pat. No. 2,961,323 to Underwood et al. It can be seen, therefor, that regenerated cellulosic casings can be produced which will exhibit one or more of those properties desired or required by the user or processor.

When utilized in the processed food industry, regenerated cellulosic casings are normally supplied to the food processor in a flattened condition and cut to predetermined lengths. Generally, these casings have relatively thick walls and, in the dry state, are quite stiff. Consequently, the food processor must soften these casings in order to render them pliable so that they can subsequently be opened and stuffed with a food emulsion. In order to soften these casings, the food processor generally soaks them in water until they become sufficiently soft and pliable for use. However, wetting flattened casings whose outer walls have been coated with a vinylidine chloride copolymer resin in order to provide them with a moistureproof-gas barrier coating is difficult since the moistureproof-gas barrier coating hinders the wetting of the parent casing material.

Another problem encountered with these casings results from their tendency to block; that is, when in the flattened condition, the surfaces of the inner walls of the casings tend to adhere to each other. Consequently, the casings can not be readily opened.

Attempts to stuff these flattened casings with a food product while they are in a dry state have also not been commercially acceptable since they can not be readily opened from a flattened state to tubular form, nor do they exhibit sufficient flexibility to enable them to be gathered onto a stuffing horn or to readily conform to the forces and pressures exerted during stuffing and closing operations.

Due to the high degree of stiffness exhibited by these casings, they also tend to resist the bending and folding to which they are subjected during shirring operations, wherein long lengths of tubular casing up to about 160 feet or more are compressed to shorter lengths of from about 1 to 2 feet. Consequently, these stiff casings are often damaged during shirring by being split and cracked. The stiffness of these casings results from the processes utilized to apply a moistureproof-gas barrier coating to them wherein the casings are typically exposed to sintering temperatures in order to develop adhesion between the moistureproof-gas barrier coating and the wall of the casing so that they can be fused to each other. As a result of these processes, the moisture content in the casings is reduced to very low levels thereby causing them to become quite stiff.

It is an object of this invention to provide a method for producing regenerated cellulosic casings having a moistureproof-gas barrier coating which casings exhibit increased flexibility so that they can be readily opened, shirred and stuffed with a product while they are in the dry state.

This and further objects of the invention will become more apparent from the ensuing description.

It has been found that the objects of the invention can be generally attained by incorporating a softening and antiblock additive in the viscose solution before the cellulose in the viscose solution is further processed and before a moistureproof-gas barrier coating is applied thereto so that there is obtained flexible, regenerated cellulosic casing.

A typical process of producing regenerated cellulosic casings, includes the steps of continuously extruding a viscose solution to form a tubular configuration and then coagulating and regenerating the cellulose in the tubular configuration to form a tubular casing. To obtain the flexible casings of the invention, the softening and antiblock additive is added to the viscose solution before it is extruded. In this manner, the softening and antiblock additive can be incorporated and cast in situ into the wall of the regenerated cellulosic casing and will not interfere with nor adversely affect the application, anchoring or functioning of a moistureproof-gas barrier coating on the outer wall of the casing.

In addition to imparting flexibility to a regenerated cellulosic casing without interfering with or adversely affecting the moistureproof-gas barrier coatings applied to the casing, the softening-antiblock additive should also exhibit low or negligible extraction from the wall of the regenerated cellulosic casing. Additionally, the softening-antiblock additive should be capable of imparting slip and antiblock properties to the inner wall of the casing and should also be preferably be acceptable for use with food items.

It has been found that the softening-antiblock additive which can be employed to impart the properties and characteristics discussed above and which will also be effective to impart flexibility to regenerated cellulosic casings can be a fatty acid ester of a polyhydric alcohol.

The fatty acid esters that can be employed are fully esterified esters of polyhydric alcohols and fat-forming fatty acids derived from natural or synthetic sources. The esters can be used in their pure state or in the form of their technical grades which are usually commercially available in the form of liquids, oils, soft masses or firm masses and preferably are normally liquid or have a melting point below about 100°F. The esters can have a single fatty acid or can have a mixture of fatty acids such as are obtained from fish and vegetable oils, animal fats and the like.

The term "fatty acid", as used herein is definitive of those fat-forming fatty acids present as such or as glycerides in natural fats. The Yearbook of Agriculture, 1959 Food, U.S. Department of Agriculture, page 716, defines "fat" as follows: "A glyceryl ester of fatty acids. Fats generally are substances of plant and animal origin. Fat may be in solid form, as butter, margarine, or other shortening, or in liquid form, as the vegetable oils."

Alcohols suitable for use in forming the esters are the polyhydric alcohols such as diethylene glycol, propylene glycol, polyoxyethylene glycols, glycerol, sorbitol, mannitol and the like.

Exemplary of the fatty acid esters of polyhydric alcohols which can be employed in the invention are the fully esterified esters such as the naturally occurring animal and vegetable fats and oils found in meats, grains, nuts and the like, which are comprised mainly of triglycerides with only trace amounts of mono- and di-glycerides and some free fatty acids. Typical of such esters which can be used in this invention are vegetable oils such as cottonseed oil, castor oil, palm oil, peanut oil, corn oil, sesame oil and the like.

In one embodiment of the invention, the softening-antiblock additive is homogeneously incorporated into the viscose solution containing cellulose. According to techniques well known to those skilled in the art, the viscose solution is then extruded into tubular form and the cellulose in the viscose is regenerated so that the softening-antiblock additive is cast in the cellulose in situ. The tubular structure is subsequently washed, desulfured, passed through glycerine baths and dried to obtain a tubular, regenerated cellulosic casing. Subsequently, a moistureproof-gas barrier coating is applied thereto.

The amount of softening-antiblock additive that can be employed to impart the desired properties and characteristics to a regenerated cellulosic casing having a moistureproof-gas barrier coating applied thereto is at least about 0.1 percent by weight and preferably at least about 2.5 percent by weight based upon the bone dry weight of cellulose in the viscose solution. Amounts of softening-antiblock additive up to about 14 percent by weight based on the bone dry weight of the cellulose in the viscose solution may be used without adversely affecting application and adhesion of the moistureproof-gas barrier coating.

In a preferred embodiment of the invention, vegetable oils, optimumly, castor oil, are employed as the softening-antiblock additive.

The invention is further illustrated by the following example. Unless otherwise indicated, all parts and percentages are by weight.

EXAMPLE

Approximately 600 feet each of six different types of regenerated cellulosic casings were fabricated according to the general process of extruding a viscose solution into a tubular configuration followed by coagulation and regeneration of the cellulose in the tubular configuration to produced tubular casings. In addition, all of the tubular casings were also glycerinated in the usual manner to soften them by passing them through glycerine dip tanks.

The glycerine content in the six types of casing, each being 1.8 mil in thickness and 2.75 inches in flat width, was varied by adjusting the number of dips to which each casing was subjected in the glycerine tanks. Thus, the glycerine softener content of the casings was varied from about 35 to 50 percent glycerine to dry cellulose by weight to demonstrate that adhesion of the moistureproof-gas barrier coating was adversely affected as the glycerine content of the casing was increased.

Castor oil was employed as the softening-antiblock additive and the amount of castor oil blended into the viscose solution was also varied for each casing produced.

Each casing was also coated with a moistureproof-gas barrier coating consisting essentially of vinylidene chloride copolymer. The moistureproof coating was applied to the flattened casings by passing the casings through a dip tank containing the coating solution.

The castor oil was blended into the viscose solution in the form of an emulsion containing 10 percent by weight castor oil. The emulsion was comprised of 600 grams castor oil, 5,275 grams distilled water and 125 grams of a commercially available dispersing agent whose major constituent was a sodium salt of a sulfated methyloleate. Although this particular dispersing agent was selected, it should be understood that the type of dispersing agent employed to form the emulsion is not critical and that other commercially available dispersing agents or surfactants can also be employed.

The emulsion was prepared by recirculating the castor oil, water and dispersing agent in four passes through a Gaulin homogenizer at 2500 p.s.i. The resultant 10 percent castor oil emulsion was then incorporated into a 7.5 percent cellulose content viscose solution by means of a conventional metering pump and the mixture was then blended in a pigment mixer. The viscose was extruded into a tubular configuration by employing a 1¾ inch diameter annular die and a 1.205 inch diameter mandrel 50 inches long at a rate of 22 feet per minute.

The amount of castor oil added to the viscose solution, and the total glycerine content in each casing is set forth in Table I below wherein letters A–F, inclusive, identify each of the six different types of casings produced.

Samples of each of the six casings produced (A–F) were tested for internal blocking on an Instron tensile tester. In this instance, the blocking of the casings was a measure of the affinity that one surface of the casing exhibited for another surface of the casing when that casing was in a flattened condition; that is, the internal blocking characteristics of the casings.

The ability to apply the moistureproof-gas barrier coating to the casings was also gauged and the results determined by assigning an arbitrary rating to each casing of "excellent", "fair" and "poor" signifying the ability to completely adhere the coating to the casing ("excellent"), the ability to adhere only part of the coating to the casing ("fair") and the inability to adhere any part of the coating to the casing ("poor").

The results of determining the internal blocking and the ability to adhere the moistureproof-gas barrier coating to the casings are also set forth in Table I below.

TABLE I

| Casing | % Castor Oil Added Based on Bone Dry Weight of Cellulose in Viscose Solution | Concentration of Softener in Tubing (% glycerine added to Cellulose) | Ability of Coating to Adhere to Casing | Internal Blocking of Casing |
|---|---|---|---|---|
| A | 0 | 35.9 | Excellent | Blocked |
| B | 0 | 50.7 | Poor | Blocked |
| C | 2.5 | 36.4 | Excellent | None |
| D | 5.0 | 35.8 | Excellent | None |
| E | 5.0 | 55.2 | Excellent | None |
| F | 0.5 | 45.4 | Excellent | None |

During processing, it was found difficult to apply the moistureproof-gas barrier coating to casings A and B due to internal blocking of these casings. As a result, air inside the tubing was not permitted to pass freely along the casing length causing air to accumulate at rollers, nip points and the like producing creases and folds in the casing. In addition the high glycerine content of casing B (50.7 percent) interfered with the ability of the moistureproof-gas barrier coating to adhere to it. However, even though casing E had a higher glycerine content (55.2 percent) than casing B, no difficulty was encountered in adhering the moistureproof-gas barrier coating to it.

Fifty foot length samples of each of the six different types of casings produced (A–F), were also shirred on a semiautomatic shirring apparatus and then tested for pin hole damage on a water burst table. This test consisted of filling each shirred length of each of the six different casings (A–F) with water until the casing burst. As the casings are filled with water, any pin holes or splits in the wall of the casings are detected by water escaping from them.

It was found that those cellulosic casings described above having a castor oil content of at least about 2.5 percent and, optimumly, about 5.0 percent helped prevent damage to the casings during shirring. Casing B, which contained a high glycerine content but which contained no castor oil, was also found to have little pin hole damage from shirring but was not as flexible or pliant as casings D and E.

Samples of each of the six types of casings identified in Table I above were also subjected to a food stuffing test. Liver sausage was selected as the food emulsion with which to stuff the casings since liver sausage is quite sensitive to oxygen and could, therefore, be used as a means to determine the barrier properties of the moistureproof-gas barrier coating on the casings. The moisture-gas barrier properties of the casings were determined by the loss in product weight which each stuffed casing exhibited.

The casing samples were manually stuffed in both the dry and wet condition. The wet casings were wetted by opening them and filling them with water in order to soak them. All the casing samples were closed at their last stuffed ends by use of string ties, plastic coated clips and metal clips. In addition, casing E was also shirred on a semi-automatic shirring apparatus in a dry condition and was then stuffed in both the dry and wet condition.

It was found that the casings which were wetted were subjected to more last closure breakage and could not be closed at all with a metal clip. Conversely, all the casings which were not wetted withstood all three types of closures.

The moistureproof-gas barrier properties of all the casings were comparable indicating that the presence of castor oil does not adversely affect these properties of the casings. In this regard, it is interesting to note that, when shirred, casing E also exhibited moisture-gas barrier properties equal to the other casings indicating that its moistureproof-gas barrier coating was not damaged during shirring. Additionally, all the stuffed casings exhibited comparable product weight loss which, in all instances, was negligible.

During stuffing and after processing of the stuffed casings, it was observed that those casings having a castor oil content of at least about 2.5 percent and, optimumly, about 5.0 percent when stuffed in the dry condition, were stuffed to a substantially uniform diameter from end to end.

After processing the liver sausage stuffed in the casings which had been wetted by subjecting the encased liver sausage to conventional cooking and curing processes, it was observed that lines formed along the length of the processed liver sausage. This was caused by the moistureproof-gas barrier coating being thinned out and, in some instances, completely separated due to stretching of the wetted casings. As a result, the encased liver sausage was not uniformly processed during cooking and curing and the liver sausage product was unattractive. Conversely, no lines formed on the liver sausages which were stuffed in the dry casings since these casings did not exhibit a tendency to stretch thereby leaving the moistureproof-gas barrier coating intact.

When a casing having a moistureproof-gas barrier coating was to be presoaked prior to being stuffed so that it could be handled in a flexible manner, such as by gathering the casing onto a stuffing horn, it was found difficult to open the casing so that it could be soaked since the casing was blocked. Surprisingly, it was found that when from about 0.1 to 2.5 percent of the softening-antiblock additive of the invention was incorporated into the cellulose containing viscose solution in the manner described hereinabove, these casings exhibited virtually no blocking.

It was also found that when a casing having a moistureproof-gas barrier coating is to be shirred and stuffed in a dry condition, it can be fabricated to exhibit the nonblocking and flexibility characteristics desired or required by incorporating preferably from about 2.5 to 7.5 percent of the softening-antiblock additive of the invention into the cellulose containing viscose solution. It was further found that amounts of softening-antiblock additives up to about 14 percent can be incorporated into the cellulose containing viscose solution without adversely affecting the application and adhesion of a moistureproof-gas barrier coating to the casing obtained.

It can be seen, therefore, that the softening-antiblock additives of the invention can be utilized to impart both antiblocking and flexibility properties to regenerated cellulosic casings having a moistureproof-gas barrier coating. Further, the regenerated cellulosic casings can be produced from viscose solutions containing from about 5 to 14 percent dry weight cellulose; preferably, from about 5 to 8 percent dry weight cellulose.

Surprisingly, it has also been found that use of the softening-antiblock additives of the invention facilitates the application of moistureproof-gas barrier coatings to regenerated cellulosic casings. In addition to the method described in the above-identified U.S. Pat. to Underwood et al. No. (2,961,323), other methods and techniques well known to those skilled in the art are also utilized to apply moistureproof-gas barrier coatings to either the inner or outer surfaces or regenerated cellulosic casings. These methods and techniques can also typically include the use of intermediate bonding or anchoring agents such as melamine formaldehyde, polyethylene imine and the like.

If it is desirable to have the moistureproof-gas barrier coating on the inner surface of the casing, the coating can first be applied to the outer surface of the casing, such as by the process disclosed in the above-identified U.S. Pat. to Underwood et al. No. (2,961,323), and the casing then be turned inside out. Alternatively, the moistureproof-gas barrier coating can be applied to the inner surface of the casing in the first instance such as by utilizing well known slugging techniques. The advantages of softening and antiblocking properties are also apparent in this method and the coated casings produced are free of wrinkles and creases.

To further improve the oxygen and moisture properties of the casing, the casing can be coated on both its inner and outer surface. The flexibility imparted to the casing by the addition of the softening-antiblock agent permits the two-side coated casing to be stuffed so that a tight, snug product is obtained.

Additionally, the improved flexibility of the moistureproof coated casing resulting from the softening-antiblock additive permits the casing to be readily inverted so that an outer surface coated casing can be converted to an inner surface coated casing and vice versa.

It has also been found that the softening-antiblock additive of this invention can be utilized with fibrous casings; that is, cellulosic casings having fibrous webs embedded therein. Fibrous casings do not generally block even after applying a moistureproof coating to them. However, when a fibrous casing having a moistureproof coating is dried, it exhibits reduced flexibility due to the very low moisture content in the substrate of the casing which is generally from about 1 to 2 percent. Attempts to shirr these dried, moistureproof coated fibrous casings generally results in creating an excessive number of pinholes, casing imper Fibrous casings produced according to the method of this invention can be more readily shirred due to the increased flexibility imparted to them. The level of softening-antiblock additive which will impart flexibility to fibrous casings has been found to be at least about 2.5 percent by weight based upon the dry weight of the fibrous casings and, preferably, at least about 5.0 percent by weight based upon the dry weight of the fibrous casing.

Although the invention has been described in some detail and with particularity, it should be understood that changes, modifications and alterations can be made therein without departing from the scope and spirit of the invention.

What is claimed is:

1. A method for producing a regenerated cellulosic casing containing a moistureproof-gas barrier coating, said casing exhibiting improved flexibility and antiblock characteristics, the method including the steps of:
    a. incorporating into a viscose solution a softening-antiblock additive in an amount of from about 2.5 to 14 percent by weight based upon the dry weight of the cellulose in the viscose solution, said softening-antiblock additive being a fully esterified fatty acid ester of a polyhydric alcohol added to said viscose solution in an aqueous emulsion thereof;
    b. extruding the viscose solution containing said softening-antiblock additive to form a tubular configuration;
    c. coagulating and regenerating the cellulose in the tubular configuration until a tubular cellulosic casing is obtained having the softening-antiblock additive incorporated in the wall thereof; and,
    d. applying a moistureproof-gas barrier coating to the tubular casing containing said softening-antiblock additive.

2. The method of claim 1 wherein the fatty acid ester is a naturally occurring fat or oil.

3. The method of claim 1 wherein the amount of softening-antiblock additive incorporated into the viscose solution is from about 2.5 to 7.5 percent by weight based upon the dry weight of the cellulose in the viscose solution.

4. The method of claim 1 wherein the moistureproof-gas barrier coating is applied to the inner surface of the casing.

5. The method of claim 1 wherein the moistureproof-gas barrier coating is applied to the outer surface of the casing.

6. The method of claim 1 wherein the moistureproof-gas barrier coating is applied to the inner and outer surface of the casing.

7. The method of claim 1 wherein the moistureproof-gas barrier coating is applied to one surface of the casing and the casing is turned inside out such that the moistureproof-gas barrier coating is on the opposite surface of the casing.

8. The method of claim 1 which includes embedding a fibrous web in the cellulose such that a tubular, fibrous cellulosic casing is obtained.

9. The method of claim 2 wherein the fatty acid ester is castor oil.

10. A regenerated cellulosic casing having a moistureproof-gas barrier coating, said casing being characterized in that it has between about 2.5 percent and 14 percent by weight based on the dry weight of cellulose of a fully esterified fatty acid ester of a polyhydric alcohol softening-antiblock additive homogeneously dispersed and incorporated in its wall such that said casing exhibits improved flexibility, is non-blocking, and can be shirred and then stuffed and filled with a product without being wetted.

11. The casing of claim 10 wherein the softening-antiblock additive incorporated in the wall of said casing is from about 2.5 to 7.5 percent by weight based upon the dry weight of the cellulose in said casing.

12. The casing of claim 10 wherein the fatty acid ester is a naturally occurring fat or oil.

13. The casing of claim 10 wherein the moisture-proof-gas barrier coating is on its inner surface.

14. The casing of claim 10 wherein the moisture-proof-gas barrier coating is on its outer surface.

15. The casing of claim 10 wherein the moisture-proof-gas barrier coating is on its inner and outer surface.

16. The casing of claim 10 wherein a fibrous web is embedded therein.

17. The casing of claim 10 wherein the fatty acid ester is castor oil.

* * * * *